(12) United States Patent
Zhang et al.

(10) Patent No.: US 10,764,414 B2
(45) Date of Patent: Sep. 1, 2020

(54) DISPLAY SCREEN COMPONENT AND ELECTRONIC DEVICE

(71) Applicant: GUANGDONG OPPO MOBILE TELECOMMUNICATIONS CORP., LTD., Dongguan, Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/148,048

(22) Filed: Oct. 1, 2018

(65) Prior Publication Data
US 2019/0158643 A1    May 23, 2019

(30) Foreign Application Priority Data
Nov. 22, 2017  (CN) .......................... 2017 1 1175972

(51) Int. Cl.
*H04M 1/02* (2006.01)
*G09G 5/10* (2006.01)
(Continued)

(52) U.S. Cl.
CPC ........ *H04M 1/0266* (2013.01); *G06F 1/3265* (2013.01); *H04M 1/0277* (2013.01);
(Continued)

(58) Field of Classification Search
CPC ...... H04N 5/2354; H04B 1/38; G06F 3/0412; G06F 3/0416; G06F 2200/1637; G06F 3/03547; H04W 4/30; H04W 12/00508; H04W 88/02; G06K 9/00805; G06K 9/00335; G06K 9/2027; G06K 9/22; G09G 2360/144; G09G 2320/0626; G09G 2354/00; G09G 5/10; G09G 2320/08;
(Continued)

(56) References Cited

U.S. PATENT DOCUMENTS 9,825,103 B2  11/2017 Rappoport et al.
2008/0006762 A1  1/2008 Fadell et al.
(Continued)

FOREIGN PATENT DOCUMENTS

CN  102968962  3/2013
CN  104375642  2/2015
(Continued)

OTHER PUBLICATIONS

"Advantages of Packaging a Proximity Sensor with an Ambient Light Sensor" by Schmitz, dated Aug. 9, 2012 (Year: 2012).*
(Continued)

*Primary Examiner* — Daniel Lai
(74) *Attorney, Agent, or Firm* — Hodgson Russ LLP

(57) ABSTRACT

Embodiments of the present disclosure provide a display screen component and an electronic device. The display screen component includes a display screen and an ambient-light sensor. The ambient-light sensor is oriented towards a periphery of the display screen, and is configured to sense an intensity of an ambient light incident on the ambient-light sensor from the periphery of the display screen.

14 Claims, 8 Drawing Sheets

(51) Int. Cl.
*G06F 1/3234* (2019.01)
*G09G 3/20* (2006.01)
*G01S 17/04* (2020.01)

(52) U.S. Cl.
CPC .............. *G01S 17/04* (2020.01); *G09G 3/20* (2013.01); *G09G 5/10* (2013.01); *G09G 2320/0626* (2013.01); *G09G 2360/144* (2013.01); *H04M 2250/12* (2013.01)

(58) Field of Classification Search
CPC .......... G09G 2360/14; G09G 2380/02; G09G 2320/0233; G09G 2320/0261; G09G 2340/14; G09G 2360/148; G09G 2360/16; G09G 5/003; H04M 2250/12; H04M 1/026; H04M 1/72519; H04M 1/72569; H04M 1/0266; H04M 1/0277
See application file for complete search history.

(56) References Cited

U.S. PATENT DOCUMENTS

| | | | | |
|---|---|---|---|---|
| 2011/0006690 | A1* | 1/2011 | Hoffman | H04N 5/58 315/150 |
| 2012/0295665 | A1* | 11/2012 | Pantfoerder | G01J 1/0407 455/566 |
| 2013/0048837 | A1* | 2/2013 | Pope | G01J 1/0422 250/214.1 |
| 2013/0176291 | A1 | 7/2013 | Leonard | |
| 2013/0256926 | A1* | 10/2013 | Dinesen | G01S 17/08 264/1.7 |
| 2014/0191110 | A1* | 7/2014 | Holenarsipur | G06F 3/03 250/206 |
| 2014/0354900 | A1* | 12/2014 | Qian | G06F 1/1658 349/12 |
| 2015/0002471 | A1* | 1/2015 | Mankowski | G06F 3/0421 345/175 |
| 2017/0126868 | A1* | 5/2017 | Evans, V | G01J 1/4204 |
| 2017/0245377 | A1 | 8/2017 | Lee | |
| 2018/0292568 | A1* | 10/2018 | Chen | G01S 17/04 |
| 2019/0080668 | A1* | 3/2019 | Holenarsipur | G01J 1/0437 |

FOREIGN PATENT DOCUMENTS

| | | |
|---|---|---|
| CN | 103327148 | 2/2016 |
| CN | 106094990 | 11/2016 |
| CN | 106550072 | 3/2017 |
| CN | 106604183 | 4/2017 |
| CN | 106679803 | 5/2017 |
| CN | 106774927 | 5/2017 |
| CN | 106850898 | 6/2017 |
| CN | 106982303 | 7/2017 |
| CN | 206559423 | 10/2017 |
| CN | 107886927 | 4/2018 |
| CN | 107979663 | 5/2018 |

OTHER PUBLICATIONS

EPO, Office Action for EP Application No. 18201521, dated Mar. 20, 2019.
WIPO, English translation of the ISR and WO for PCT/CN2018/110879, dated Jan. 4, 2019.
SIPO, First Office Action for CN Application No. 201711175972.4, dated May 27, 2019.
SIPO, Notice of Registration for CN Application No. 201711175972.4, dated Dec. 25, 2019.

* cited by examiner

DISPLAY SCREEN COMPONENT AND ELECTRONIC DEVICE

CROSS REFERENCE TO RELATED APPLICATION

The present application claims priority to Chinese Application No. 201711175972.4, filed with the State Intellectual Property Office of P. R. China on Nov. 22, 2017, the entire contents of which are incorporated herein by reference.

FIELD

The present disclosure relates to a display screen component and an electronic device.

BACKGROUND

With developments of communication technology, the electronic device (such as the smart phone) is more and more popular. In a process of using the electronic device, for example during a call, in order to avoid the user's misoperations of the electronic device, when the user's face approaches the electronic device to a certain distance, the display screen of the electronic device will go out automatically.

Generally, the electronic device senses the ambient light intensity through the ambient-light sensor, and controls the brightness of the display screen of the electronic device according to the sensed data.

SUMMARY

Embodiments of a first aspect of the present disclosure provide a display screen component. The display screen component includes a display screen and an ambient-light sensor. The ambient-light sensor is disposed oriented towards a periphery of the display screen, and is configured to sense an intensity of an ambient light incident on the ambient-light sensor from the periphery of the display screen.

Embodiments of a second aspect of the present disclosure provide an electronic device. The electronic device includes a housing and a display screen component coupled to the housing. The display screen component includes a display screen and an ambient-light sensor. The ambient-light sensor is oriented towards the housing, and is configured to sense an intensity of an ambient light through the housing. The housing allows the ambient light to reach the ambient-light sensor from outside.

Embodiments of a third aspect of the present disclosure provide another electronic device. The electronic device includes a housing and a display screen component coupled to the housing. The display screen component includes a display screen having a notch; and a sensor unit arranged in the notch.

BRIEF DESCRIPTION OF THE DRAWINGS

To describe technical solutions in embodiments of the present disclosure more clearly, the following will briefly introduce the accompanying drawings required for the description of the embodiments. Obviously, the accompanying drawings described below show some embodiments of the present disclosure, and those skilled in the art can obtain other drawings based on these drawings without paying creative efforts.

DETAILED DESCRIPTION

Figure 1:
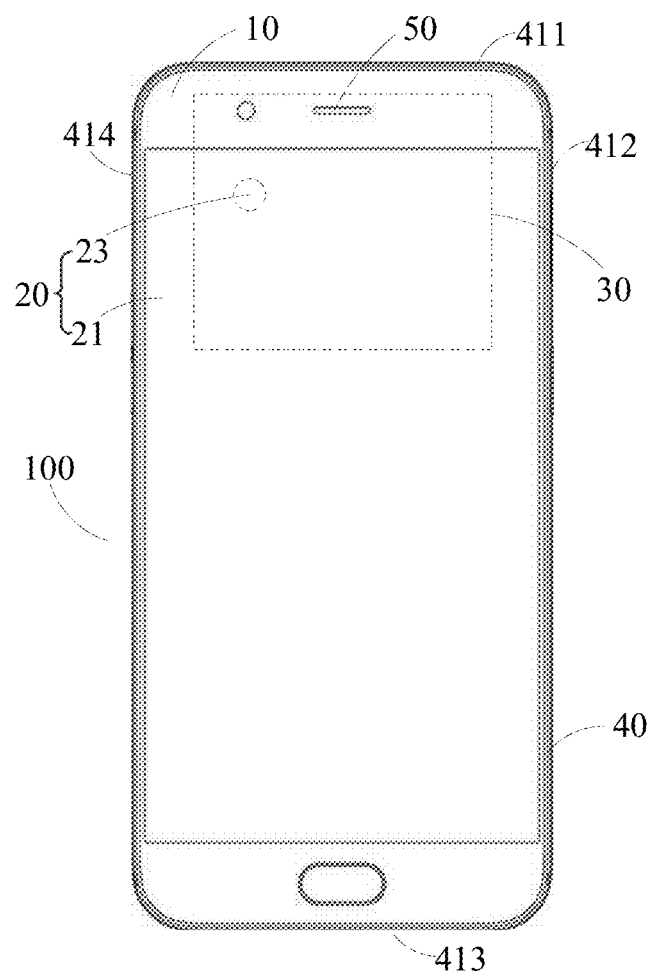
FIG. 1 is a schematic view of an electronic device according to embodiments of the present disclosure.

Technical solutions in embodiments of the present disclosure will be clearly and completely described below with reference to the accompanying drawings in the embodiments of the present disclosure. Obviously, the embodiments described herein are only a part but not all of the embodiments of the present application. Based on the embodiments of the present disclosure, all other embodiments obtained by those skilled in the art without paying creative efforts, fall into the protection scope of the present application.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise," should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance and are not intended to implicitly indicate the number of the technical feature mentioned. Thus, features limited by "first" and "second" are intended to indicate or imply including one or more than one these features. In the description of the present disclosure, "a plurality of" means two or more than two, unless specified otherwise.

In the present disclosure, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements or interaction relationships between two elements.

The above terms can be understood by those skilled in the art according to specific situations.

In the description of the present disclosure, a structure in which a first feature is "on" or "beneath" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

Embodiments of the present disclosure provide a sensor unit, a display screen component and an electronic device, which will be described in details in the following. The display screen component may be arranged in the electronic device, and the electronic device may be smart phone or a table computer.

The electronic device according to embodiments of the present disclosure includes a housing and a display screen component coupled to the housing. The display screen component includes a display screen and an ambient-light sensor oriented towards the housing. The ambient-light sensor is configured to sense an intensity of an ambient light through the housing, and the housing allows the ambient light to reach the ambient-light sensor from outside.

FIG. 1 is a schematic view of an electronic device 100 according to embodiments of the present disclosure. As illustrated in FIG. 1, the electronic device 100 includes a cover plate 10, a display screen component 20, a circuit board 30, a housing 40 and a telephone receiver 50.

The cover plate 10 is coupled to the display screen component 20 so as to cover the display screen component 20. The cover plate 10 may be a transparent glass cover plate. In some embodiments, the cover plate 10 may be a glass cover plate made of materials such as sapphire or the like.

The display screen component 20 is coupled to the housing 40 to provide a display surface of the electronic device 100. The display screen component 20 serves as a front cover of the electronic device 100 to define an enclosed space together with the housing 40, for receiving other electronic elements of the electronic device 100 therein. Also, the display screen component 20 serves as the display surface of the electronic device 100 for displaying information such as images, texts or the like. The display screen component 20 may include a display screen 21 and a sensor unit 23 disposed at a side of the display screen.

The circuit board 30 is arranged in the housing 40, such that the circuit board 30 is received in the above enclosed space. The circuit board 30 may be a mainboard of the electronic device 100. The circuit board 30 has a ground point for grounding of the circuit board 30. The circuit board 30 may be integrated with functional components such as a camera, a processor or the like. Also, the display screen component 20 may be electronically coupled to the circuit board 30.

In some embodiments, the circuit board 30 has a display control circuit. The display control circuit outputs an electrical signal to the display screen component 20, so as to control the display screen component 20 to display information.

The housing 40 provides an external outline of the electronic device 100. The housing 40 may be a metal housing, such as an aluminum alloy housing. It should be noted that, materials of the housing 40 in embodiments of the present disclosure are not limited to this, and other materials can be used. For an instance, the housing 40 may include a ceramic middle frame or a glass middle frame. For another instance, the housing 40 may include a plastic middle frame. For a further instance, the housing 40 may be a structure constituted by a metal part and a plastic part fitted with each other, and formed by injection-molding the plastic part to a metal sheet, for example.

Figure 2:
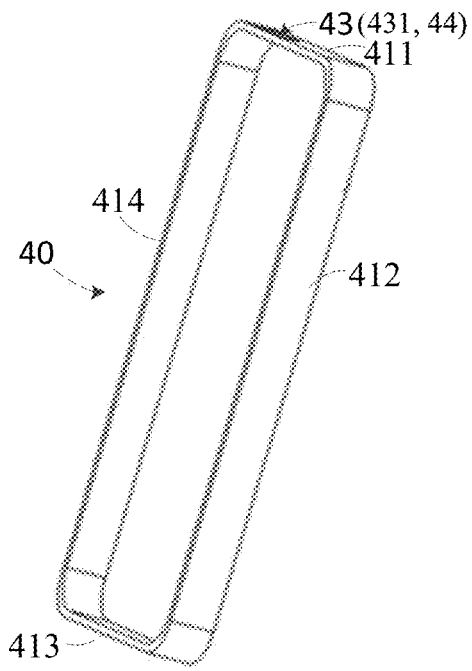
FIG. 2 is a schematic view of a housing according to embodiments of the present disclosure.

FIG. 2 is a schematic view of the housing 40 according to embodiments of the present disclosure.

In some embodiments, as illustrated in FIG. 2, the housing 40 includes at least one light-transparent portion 43, and the light-transparent portion 43 has optical transparency. In some embodiments, the light-transparent portion 43 defines a light-transparent hole 431 therein, the light-transparent hole 431 allows light transmission, and hence the sensor unit 23 may sense an ambient light intensity through the light-transparent hole 431. In some embodiments, the light-transparent portion 43 may further include a guard plate 44, the guard plate is light transparent and may be arranged at the light-transparent hole 431, to close the light-transparent hole 431, such that a function of light transmission can be obtained, and also, elements in the housing 40 can be protected. In some embodiments, the housing 40 includes a first rim 411, a second rim 412, a third rim 413 and a fourth rim 414 connected end to end. That is, the first rim 411, the second rim 412, the third rim 413 and the fourth rim 414 constitute a periphery of the housing 40. The first rim 411 is opposite to the third rim 413, and the second rim 412 is opposite to the fourth rim 414. In some embodiments, the light-transparent portion 43 may be arranged in the first rim 411. The light-transparent portion 43 may be arranged in a surface of the first rim 411 facing the display screen 21 or another surface of the display screen 21 opposite to the surface of the first rim 411 facing the display screen 21. Or, the light-transparent portion 43 may also be arranged in a side surface of the first rim 411 adjacent to the surface of the first rim 411 facing the display screen 21.

It should be noted that, when a user holds the electronic device 100 in hand, the user usually grasps two sides of the electronic device 100, such as the second rim 412 and the fourth rim 414, and a portion of the electronic device 100 where the user grasps is close to the third rim 413. In the present disclosure, the light-transparent portion 43 is arranged in the first rim 411, and thus the light-transparent portion 43 tends not to be shielded, such that the ambient light intensity sensed by the sensor unit 23 is accurate, and hence a control of the electronic device 100 on brightness of the display screen 21 is accurate. Thus, the electronic device 100 is adapted to the environment, thereby reducing damages to the user's eyes.

Figure 3:
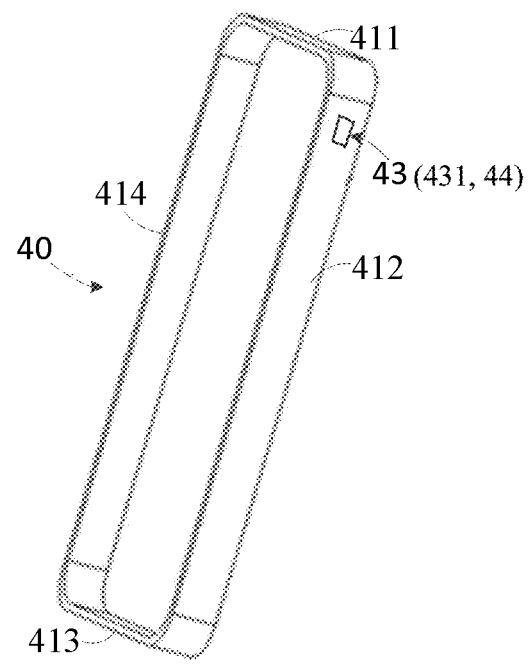
FIG. 3 is another schematic view of a housing according to embodiments of the present disclosure.

FIG. 3 is another schematic view of the housing 40 according to embodiments of the present disclosure.

In some embodiments, as illustrated in FIG. 3, the housing illustrated in FIG. 3 differs from the housing illustrated in FIG. 2 in that the light-transparent portion 43 of the housing 40 in FIG. 3 is arranged in the second rim 412, and close to the first rim 411. In some embodiments, the light-transparent portion 43 may be arranged in a transition portion from the first rim 411 to the second rim 412, and further, the light-transparent portion 43 may be adjacent to the first rim 411.

Figure 4:
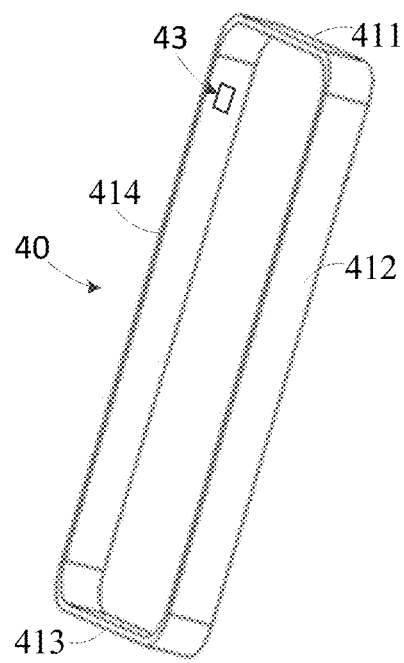
FIG. 4 is a still another schematic view of a housing according to embodiments of the present disclosure.

FIG. 4 is another schematic view of the housing 40 according to embodiments of the present disclosure.

In some embodiments, as illustrated in FIG. 4, the housing illustrated in FIG. 4 differs from the housing illustrated in FIG. 2 in that the light-transparent portion 43 of the housing 40 in FIG. 4 is arranged in the fourth rim 414, and close to the first rim 411. In some embodiments, the light-transparent portion 43 may be arranged in a transition portion from the first rim 411 to the fourth rim 414, and further, the light-transparent portion 43 may be adjacent to the first rim 411.

Figure 5:
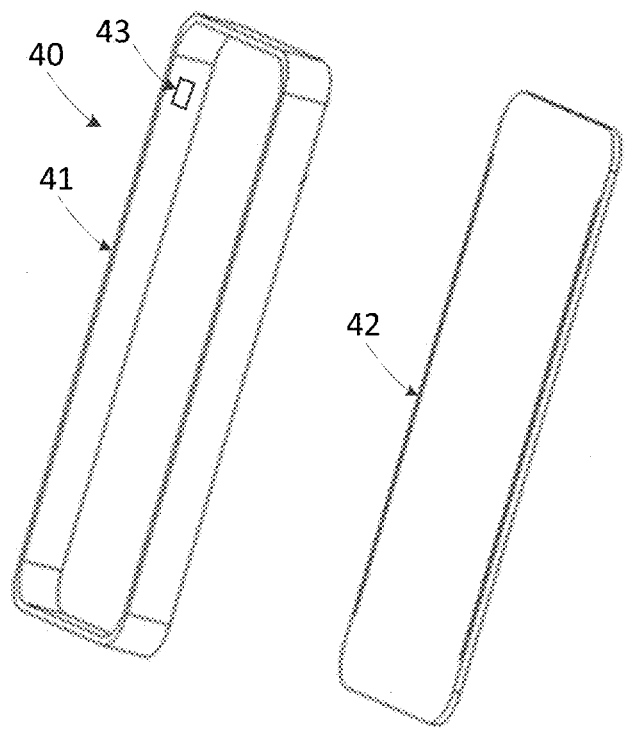
FIG. 5 is a further schematic view of a housing according to embodiments of the present disclosure.

In some embodiments, the housing 40 may be integrally molded. It should be noted that, the structure of the housing 40 according to embodiments of the present disclosure is not limited to this. For example, as illustrated in FIG. 5, in which FIG. 5 is another schematic view of the housing 40 according to embodiments of the present disclosure, the housing 40 includes a middle frame 41 and a rear cover 42, and the middle frame 41 is fixedly coupled to the rear cover 42 to provide the housing 40.

Embodiments of the present disclosure provide a display screen component. The display screen component includes a display screen and an ambient-light sensor oriented towards a periphery of the display screen. The ambient-light sensor is configured to sense an intensity of an ambient light incident on the ambient-light sensor from the periphery of the display screen.

Figure 6:
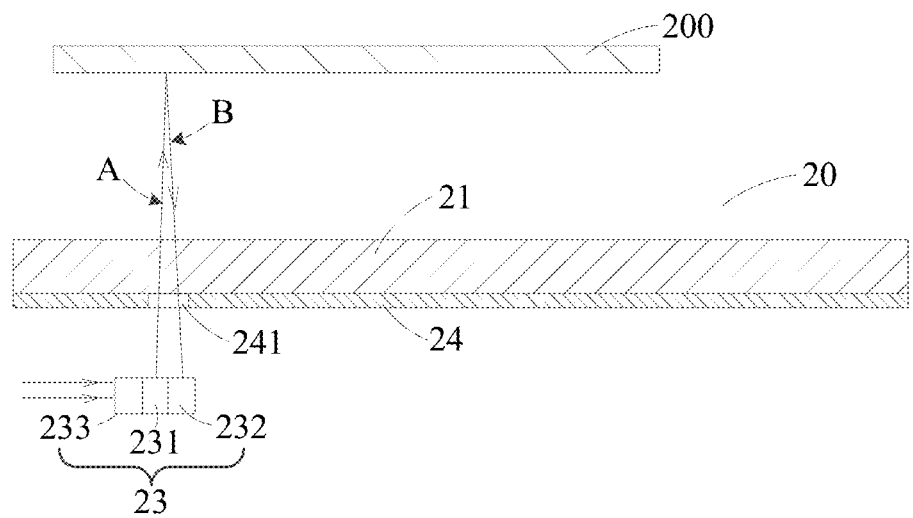
FIG. 6 is a schematic view of a display screen component according to embodiments of the present disclosure.

FIG. 6 is a schematic view of the display screen component 20 according to embodiments of the present disclosure.

In some embodiments, as illustrated in FIG. 6, the display screen component 20 includes a display screen 21, a sensor unit 23 and a light shield layer 24. The sensor unit 23 and the light shield layer 24 are arranged at a side of the display screen 21. In some embodiments, the sensor unit 23 and the light shield layer 24 are arranged at an inner side of the display screen 21. The inner side means an invisible side of the display screen 21, when observed from an exterior of the electronic device 100. That is, the light shield layer 24 and the sensor unit 23 are arranged inside the electronic device 100. The sensor unit 23 may be spaced apart from the display screen 21, and the light shield layer 24 may be arranged between the sensor unit 23 and the display screen 21.

In some embodiments, the light shield layer 24 may be a lamellar structure made of materials such as foam or steel sheets. The light shield layer 24 is used to hide an internal structure of the electronic device 100, so as to prevent the user from observing electronic elements inside the electronic device 100 through the display screen 21.

In the embodiments as illustrated in FIG. 6, the light shield layer 24 has an opening 241. The opening 241 allows signals (such as optical signals and acoustical signals) to pass therethrough.

In some embodiments, the opening 241 is a round hole. The opening 241 has a diameter of 2-4 millimeters. In other embodiments, the opening 241 may be a square hole, an elliptical hole or a hole having another shape. It should be noted that, the opening 241 may be arranged at an edge of the light shield layer 241, and the opening 241 may be a notch recessed inwards from the edge of the light shield layer 241.

In some embodiments, the display screen 21 may be a liquid crystal display (LCD) or an organic light-emitting diode (OLED) display. When the display screen 21 is the liquid crystal display, the display screen 21 includes a backlight plate, a lower polarizer, an array substrate, a liquid crystal layer, a color film substrate and an upper polarizer which are laminated in sequence. Moreover, since the liquid crystal display has a low light transmittance, the liquid crystal display needs to define a hole therein or to be processed to provide a relatively high light transmittance in another way, so as to allow the light to pass therethrough. When the display screen 21 is the organic light-emitting diode display, the display screen 21 includes a base layer, an anode, an organic layer, an electrically conductive layer, an emitting layer and a cathode which are laminated in sequence. The light-emitting diode display has a relatively high light transmittance and hence does not need to be treated like the liquid crystal display. That is, in some embodiments, the display screen may be a transparent display screen. That is, the display screen has characteristics of transparency and allows signals to pass therethrough.

Figure 7:
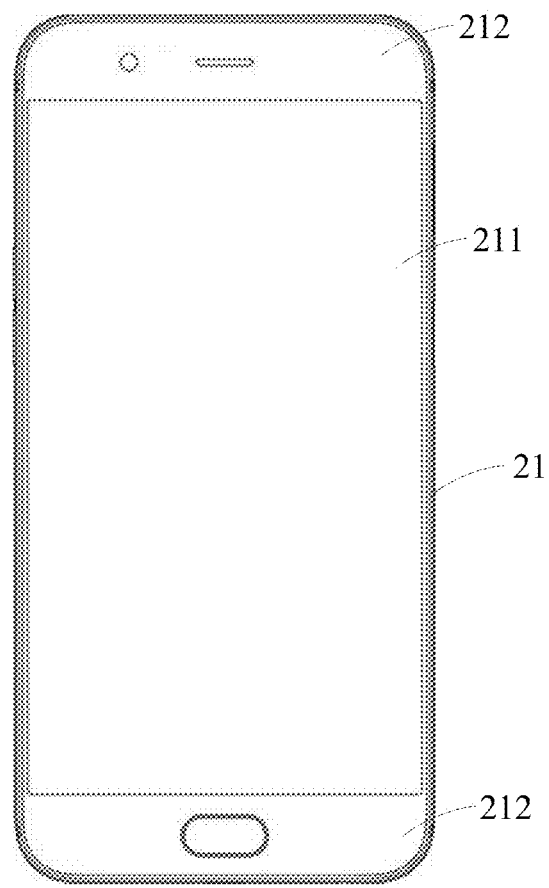
FIG. 7 is a planar view of a display screen according to embodiments of the present disclosure.

FIG. 7 is a planar view of the display screen 21 according to embodiments of the present disclosure.

In some embodiments, as illustrated in FIG. 7, the display screen 21 includes a display area 211 and a non-display area 212, and the display area 211 may be used to display images in the electronic device 100 or allow the user's touch operations. A top portion of the non-display area 212 has a hole for sound and light transmission, and a bottom portion of the non-display area 212 may be provided with functional components therein, such as a fingerprint module and a touch button. The cover plate 10 is coupled to the display screen 21 to cover the display screen 21, thus providing a display region and a non-display region corresponding to the display area and the non-display area of the display screen 21. References can be made to the display area and the non-display area of the display screen 21 for specific arrangements.

It should be noted that, the structure of the display screen 21 is not limited to this. For example, the display screen may be a full screen display or a notched display screen.

Figure 8:
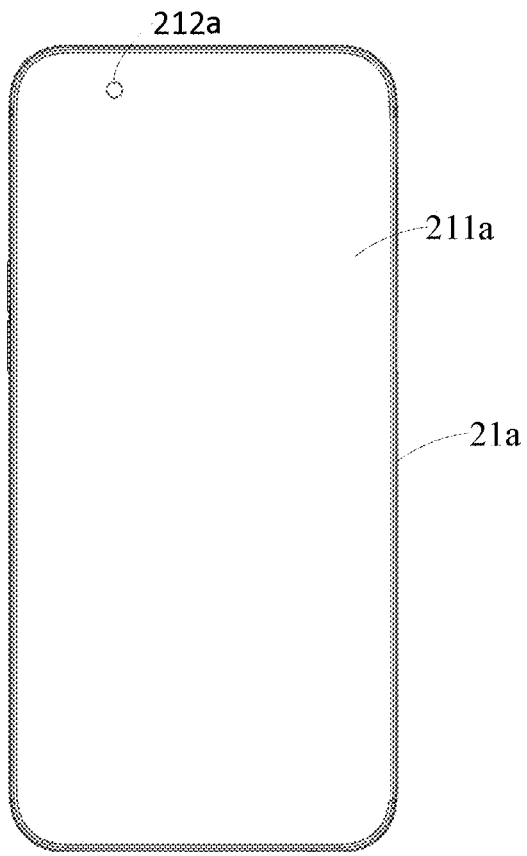
FIG. 8 is another planar view of a display screen according to embodiments of the present disclosure.

FIG. 8 is another planar view of a display screen 21a according to embodiments of the present disclosure.

In some embodiments, as illustrated in FIG. 8, the display screen 21a illustrated in FIG. 8 differs from the display screen 21 illustrated in FIG. 7 in that a non-display area 212a is directly provided in the display screen 21a. For example, the non-display area 212a in the display screen 21a is configured as a light-transparent structure, so as to allow the optical signals to pass therethrough. Or, a hole or a notch for light transmission is directly provided in the non-display area of the display screen 21a, and thus a front-facing camera or the sensor unit may be arranged in the non-display area, so as to allow the front-facing camera to take photos and a photoelectric sensor to have a detection. The display area of the display screen 21*a* may overspread a whole surface of the electronic device.

It should be noted that, in embodiments of the present disclosure, the non-display area may not be provided, the whole surface of the display screen may be configured to have a full display, and the display screen may be provided with a portion which allows the light emission and light reception of the sensor unit.

The opening 241 in the light shield layer 24 of the display screen 21 is arranged at the display area 211 of the display screen 21. With the opening 241, the sensor unit 23 can achieve a proximity sensing function of the electronic device 100, and thus there is no need to provide a separate opening in the non-display area of the display screen 21.

The sensor unit 23 may include a signal emitter 231, a signal receiver 232 and an ambient-light sensor 233.

The signal emitter 231 is used to send out a detecting signal A. The detecting signal A reaches the display screen 21 through the opening 241, and is transmitted to outside after passing through the display screen 21. The detecting signal A is reflected into a reflected signal B after touching an external object 200 (for example, a user's face). The reflected signal B is transmitted to the signal receiver 232 through the opening 241 after passing through the display screen 21. In some embodiments, the signal emitter 231 may be an infrared emitter for emitting an infrared light.

After receiving the reflected signal B, the signal receiver 232 may output the received signal to a processor of the electronic device 100 to be processed, so as to control the display screen of the electronic device 100 to light up or go out. In some embodiments, the signal receiver 232 may be an infrared receiver for receiving the infrared light.

The ambient-light sensor 233 senses the intensity of an ambient light incident on the ambient-light sensor 233 from a periphery of the display screen 21. Since the periphery of the display screen 21 is arranged opposite and adjacent to a periphery of the housing 40, i.e. the periphery of the display screen 21 is arranged opposite and adjacent to the first rim 411, the second rim 412, the third rim 413 and the fourth rim 414 of the housing 40 respectively, the ambient light to be sensed by the ambient-light sensor 233 may reach the ambient-light sensor 233 via any one of the four rims of the housing 40. Thus, the ambient light to be sensed by the ambient-light sensor 233 does not pass through the display screen 21. Compared with the case in which the ambient light reaches the ambient-light sensor 233 after passing through the display screen 21, in embodiments of the present disclosure, effects of the display screen 21 on the ambient light can be reduced, and thus the ambient light sensed by the ambient-light sensor 233 is more accurate.

Since the signal needs to pass through the display screen 21 during the signal emission of the signal emitter 231 and the signal reception of the signal receiver 232, the signal emitter 231 and the signal receiver 232 may emit and receive an infrared light signal, such that the effects of the display screen 21 on such signal are reduced. However, the effects of the display screen 21 on the ambient light are still great. Therefore, during the sensing of the ambient light in the present disclosure, the ambient light which does not pass through the display screen 21 is sensed, i.e. the ambient light is sensed through the periphery of the electronic device 100, and thus the sensing of the surrounding environment is accurate, such that the processor of the electronic device 100 can adjust the brightness of the display screen 21 accurately.

Thus, the brightness of the display screen 21 is adapted to the environment, thereby reducing damages to the user's eyes.

In some embodiments, the ambient-light sensor 233 is arranged close to or even adjacent to a periphery of the display screen 21. That is, the ambient-light sensor 233 is arranged close to or even adjacent to a periphery of the housing 40, such that the ambient-light sensor 233 is closer to a sensing position, thus saving space of the electronic device 100. In such embodiments, the sensing position indicates a position where the ambient light is detected, i.e. a position where the light-transparent portion 43 is arranged and where the ambient light is introduced.

In some embodiments, the periphery of the housing 40 is provided with the light-transparent portion 43, and the light-transparent portion 43 allows the ambient-light sensor 233 to sense the ambient light intensity. The light-transparent portion 43 may be arranged in the first rim 411, the second rim 412, the third rim 413 or the fourth rim 414. It should be noted that, references may be made to the above descriptions for a specific position of the light-transparent portion 43, which will not be elaborated herein.

In some embodiments, the light-transparent portion 43 may not only be arranged in the periphery of the housing 40, but also may be arranged between the periphery of the housing 40 and the periphery of the display screen 21. That is, the light-transparent portion 43 may include a first light-transparent portion arranged in the periphery of the housing 40 and a second light-transparent portion arranged in the periphery of the display screen 21. The first light-transparent portion may be configured as a light-transparent hole, and the second light-transparent portion may be configured as a light-transparent region of the display screen 21. The first light-transparent portion is arranged opposite to at least a part of the second light-transparent portion. The first light-transparent portion is adjacent to the second light-transparent portion and communicated with the second light-transparent portion.

It should be noted that, in some embodiments, a direction in which the signal emitter 231 emits the detecting signal is defined as a first direction, and a direction in which the ambient-light sensor 233 senses the ambient light is defined as a second direction, that is, the ambient light reaches the ambient-light sensor 233 in the second direction. The first direction has an included angle relative to the second direction, and the included angle is less than 135 degrees and larger than 45 degrees. In some embodiments, the included angle is 90 degrees.

In some embodiments, the signal emitter 231 and the signal receiver 232 may also be arranged close to or even adjacent to the periphery of the display screen 21, and the signal emitter 231 and the signal receiver 232 may be adjacent to the ambient-light sensor 233 or not.

In some embodiments, the sensor unit 23 includes the signal emitter 231 and the signal receiver 232.

The signal emitter 231 is used to send out the detecting signal A. The detecting signal A is transmitted to outside after passing through the opening 241 and the display screen 21. The detecting signal A is reflected into the reflected signal B after touching the external object 200 (for example, the user's face). The reflected signal B enters the signal receiver 232 through the display screen 21 and the opening 241. In some embodiments, the signal emitter 231 may be the infrared emitter for emitting the infrared light.

After receiving the reflected signal B, the signal receiver 232 may output the received signal to the processor of the electronic device 100 to be processed, so as to control the display screen of the electronic device 100 to light up or go out. In some embodiments, the signal receiver 232 may be the infrared receiver for receiving the infrared light.

Figure 9:
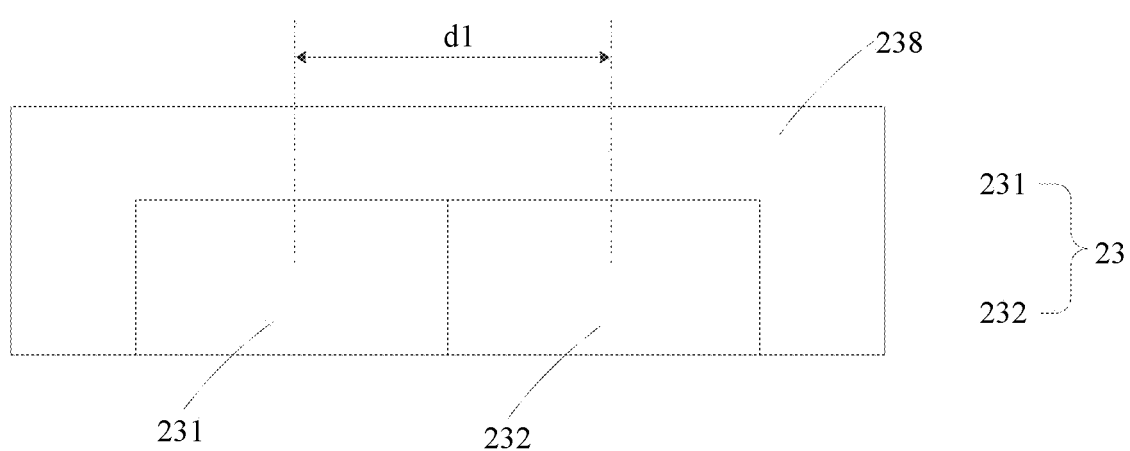
FIG. 9 is a schematic view of a sensor unit according to embodiments of the present disclosure.

FIG. 9 is a schematic view of the sensor unit 23 according to embodiments of the present disclosure.

In some embodiments, as illustrated in FIG. 9, the sensor unit 23 includes the signal emitter 231 and the signal receiver 232. The signal emitter 231 and the signal receiver 232 are arranged adjacent to each other. A distance d1 from a geometric center of the signal emitter 231 to a geometric center of the signal receiver 232 ranges from 2 millimeters to 14 millimeters. It should be noted that, in other embodiments, the distance d1 from the geometric center of the signal emitter 231 to the geometric center of the signal receiver 232 may range from 1 millimeter to 2 millimeters.

In some embodiments, the signal emitter 231 and the signal receiver 232 are packaged into a first chip 238, and the signal emitter 231 and the signal receiver 232 may be arranged adjacent to each other, so as to reduce a volume of the first chip 238.

Figure 10:
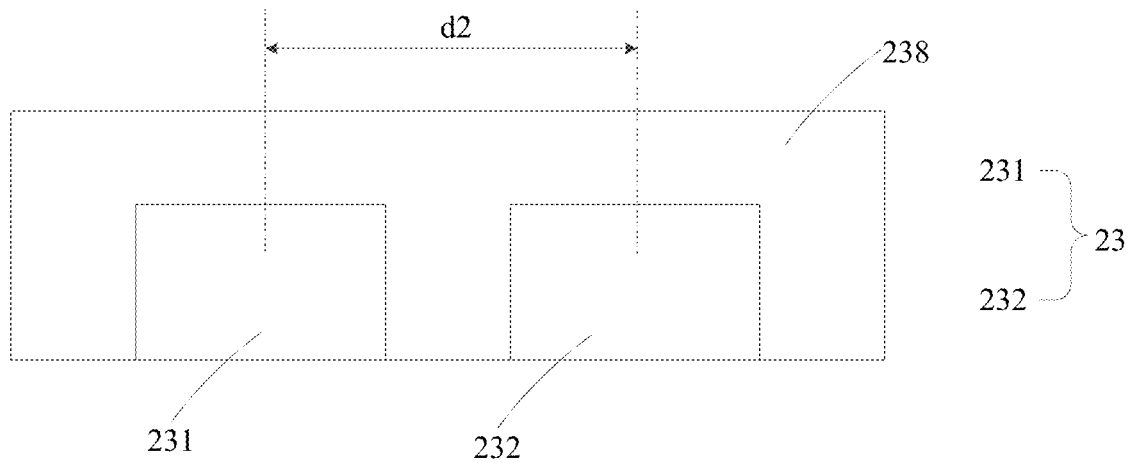
FIG. 10 is another schematic view of a sensor unit according to embodiments of the present disclosure.

FIG. 10 is another schematic view of the sensor unit 23 according to embodiments of the present disclosure.

In some embodiments, as illustrated in FIG. 10, the sensor unit 23 includes the signal emitter 231 and the signal receiver 232. The signal emitter 231 and the signal receiver 232 are spaced apart from each other. A distance d2 between the signal emitter 231 and the signal receiver 232 ranges from 2 millimeters to 14 millimeters. It should be noted that, in other embodiments, the distance d2 between the signal emitter 231 and the signal receiver 232 may range from 1 millimeter to 2 millimeters. In some embodiments, the above distance is a distance from a geometric center of the signal emitter 231 to a geometric center of the signal receiver 232. Since the signal emitter 231 and the signal receiver 232 are spaced apart from each other, the isolation between the signal emitter 231 and the signal receiver 232 can be improved, thus reducing effects of the signal emitted by the signal emitter 231 on the signal receiver 232.

In some embodiments, the signal emitter 231 and the signal receiver 232 are packaged into the first chip 238.

Figure 11:
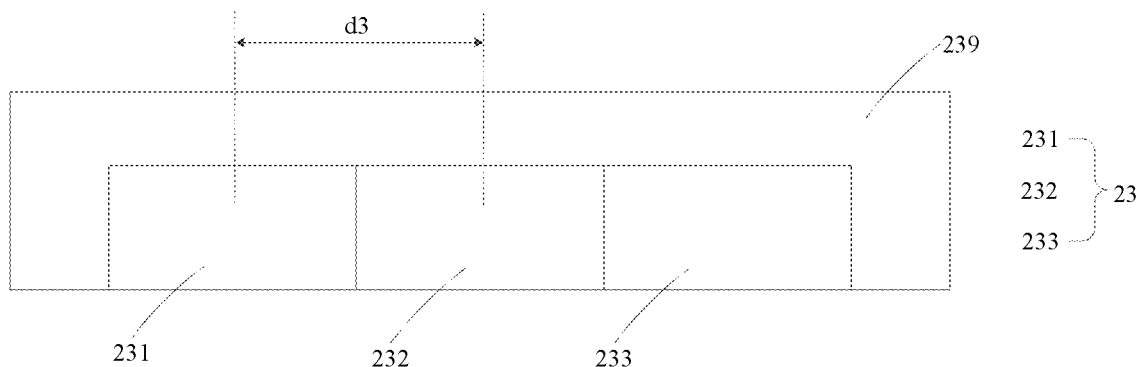
FIG. 11 is a further schematic view of a sensor unit according to embodiments of the present disclosure.

FIG. 11 is another schematic view of the sensor unit 23 according to embodiments of the present disclosure.

In some embodiments, as illustrated in FIG. 11, the sensor unit 23 includes the signal emitter 231, the signal receiver 232 and the ambient-light sensor 233. The ambient-light sensor 233 is used to detect the ambient light intensity. The electronic device 100 may adjust the brightness of the display screen 21 according to the ambient light intensity detected by the ambient-light sensor 233. The signal emitter 231, the signal receiver 232 and the ambient-light sensor 233 are arranged adjacent to one another. A distance d3 from a geometric center of the signal emitter 231 to a geometric center of the signal receiver 232 ranges from 2 millimeters to 14 millimeters. It should be noted that, in other embodiments, the distance d3 from the geometric center of the signal emitter 231 to the geometric center of the signal receiver 232 may range from 1 millimeter to 2 millimeters.

In some embodiments, the signal emitter 231, the signal receiver 232 and the ambient-light sensor 233 are packaged into a second chip 239.

Figure 12:
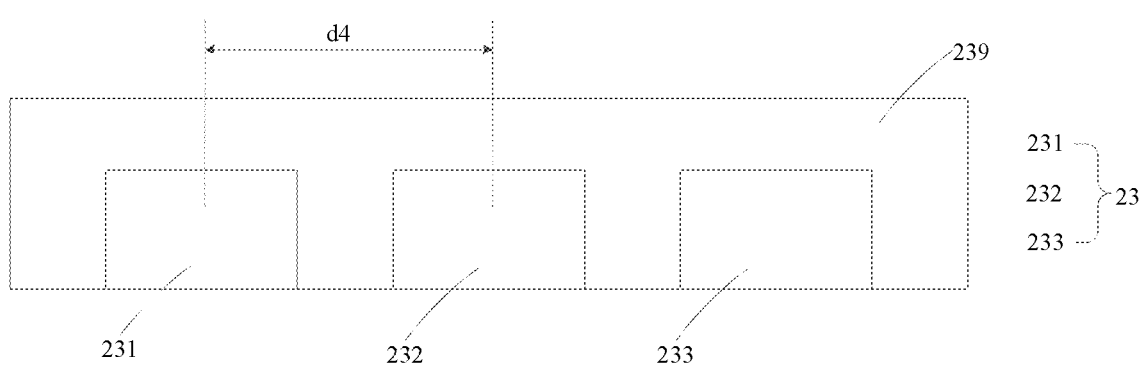
FIG. 12 is a still further schematic view of a sensor unit according to embodiments of the present disclosure.

FIG. 12 is another schematic view of the sensor unit 23 according to embodiments of the present disclosure.

In some embodiments, as illustrated in FIG. 12, the sensor unit 23 includes the signal emitter 231, the signal receiver 232 and the ambient-light sensor 233. The ambient-light sensor 233 is used to detect the ambient light intensity. The electronic device 100 may adjust the brightness of the display screen 21 according to the ambient light intensity detected by the ambient-light sensor 233.

The signal emitter 231, the signal receiver 232 and the ambient-light sensor 233 are spaced apart from one another. A distance d4 from the signal emitter 231 to the signal receiver 232 ranges from 2 millimeters to 14 millimeters. It should be noted that, in other embodiments, the distance d4 from the signal emitter 231 to the signal receiver 232 may range from 1 millimeter to 2 millimeters. In some embodiments, the above distance is a distance from a geometric center of the signal emitter 231 to a geometric center of the signal receiver 232. Since the signal emitter 231, the signal receiver 232 and the ambient-light sensor 233 are spaced apart from one another, the isolation among the signal emitter 231, the signal receiver 232 and the ambient-light sensor 233 is improved, thus reducing effects of the signal emitted by the signal emitter 231 on the signal receiver 232 and the ambient-light sensor 233.

In some embodiments, the signal emitter 231, the signal receiver 232 and the ambient-light sensor 233 are packaged into the second chip 239.

It should be noted that, an arrangement position of the sensor unit 23 according to embodiments of the present disclosure is not limited to this.

Embodiments of the present disclosure provide another electronic device. The electronic device includes a housing and a display screen component coupled to the housing. The display screen component includes a display screen having a notch and a sensor unit arranged in the notch.

Figure 13:
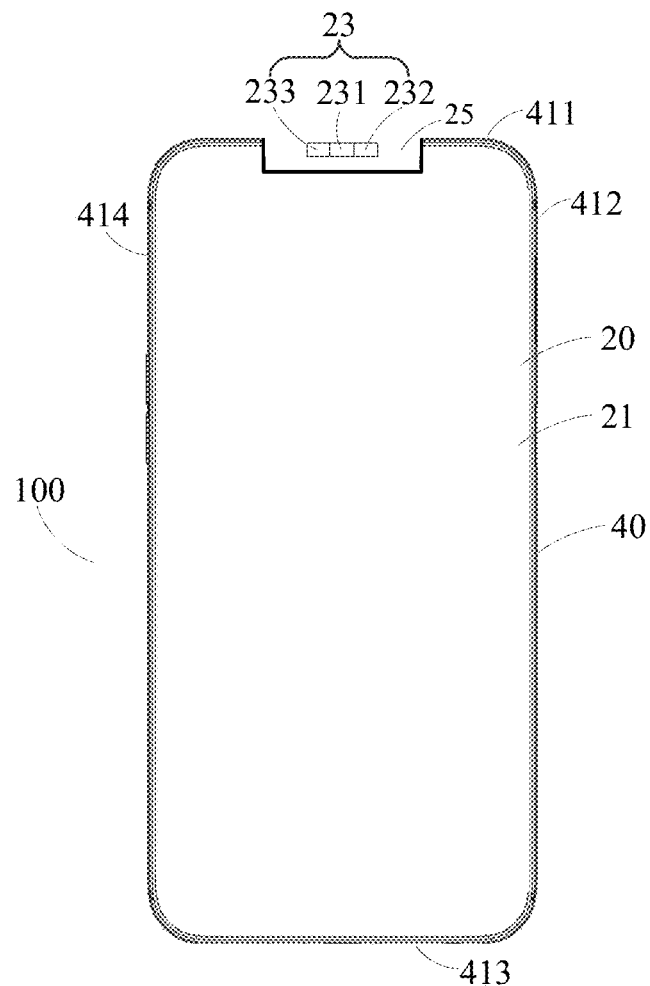
FIG. 13 is another schematic view of an electronic device according to embodiments of the present disclosure.

FIG. 13 is another schematic view of the electronic device 100 according to embodiments of the present disclosure.

In some embodiments, as illustrated in FIG. 13, the electronic device illustrated in FIG. 13 differs from the electronic device illustrated in FIG. 1 in that the display screen 21 in FIG. 13 includes a notch 25. The notch 25 may be arranged adjacent to the first rim 411, the second rim 412, the third rim 413 or the fourth rim 414. As illustrated in FIG. 13, the notch 25 is arranged adjacent to the first rim 411. Or, the notch 25 may be arranged adjacent to a connection between two rims. The sensor unit 23 is arranged in the notch 25. In some embodiments, the sensor unit 23 includes the signal emitter 231, the signal receiver 232 and the ambient-light sensor 233, and the signal emitter 231, the signal receiver 232 as well as the ambient-light sensor 233 all are arranged in the notch 25. Thus, during the signal emission of the signal emitter 231 and the signal reception of the signal receiver 232, the signal does not need to pass through the display screen 21, and also, when the ambient-light sensor 233 senses the ambient light intensity, the ambient light does not need to pass through the display screen 21.

Figure 14:
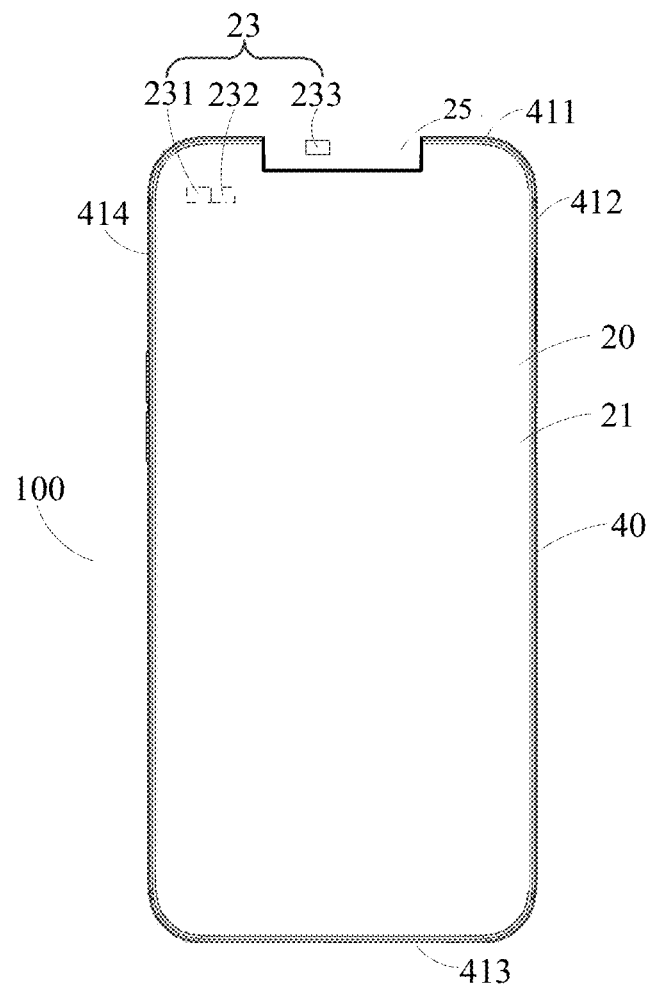
FIG. 14 is a further schematic view of an electronic device according to embodiments of the present disclosure.

FIG. 14 is another schematic view of the electronic device 100 according to embodiments of the present disclosure. As illustrated in FIG. 14, the electronic device illustrated in FIG. 14 differs from the electronic device illustrated in FIG. 13 in that the signal emitter 231 and the signal receiver 232 are arranged at the inner side of the display screen 21 in FIG. 14, and thus the signal needs to pass through the display screen 21 during the signal emission of the signal emitter 231 and the signal reception of the signal receiver 232.

In the above embodiments of the present disclosure, the functional component is arranged at the inner side of the display screen, and the sensor unit emits the signal to the outside or receives the signal from the outside through the display screen. It should be noted that, in embodiments of the present disclosure, the sensor unit may also be arranged in the display screen. For example, the display screen has a receiving groove therein, or the display screen has a receiving groove in an outer surface thereof, and the sensor unit is received in the receiving groove of the display screen.

The above is the detailed introduction of the sensor unit, the display screen component and the electronic device according to embodiments of the present disclosure, the principle and the implementation mode of the present disclosure are elaborated by means of specific examples, and the illustration for the above embodiments are merely used to understand the present disclosure. Meanwhile, the specific embodiments and the applied ranges can be changed for those skilled in the art according to the concept of the present disclosure. In general, the content of the present specification should not be construed to limit the present disclosure.

What is claimed is:

1. A display screen component, comprising:
   a display screen; and
   an ambient-light sensor arranged at an inner side of the display screen and covered by the display screen, the ambient-light sensor being oriented towards a periphery of the display screen, and configured to sense an intensity of an ambient light which is incident on the ambient-light sensor through the periphery of the display screen, the ambient light not passing through the display screen;
   wherein the display screen component further comprises a signal emitter and a signal receiver communicated with the signal emitter, the ambient-light sensor, the signal emitter and the signal receiver are arranged adjacent to one another without a gap therebetween, and packaged into a chip;
   wherein the signal emitter is configured to send out a detecting signal to outside in a first direction, and the signal receiver is configured to receive a reflected signal obtained via reflecting the detecting signal by an external object;
   the ambient-light sensor is configured to sense the intensity of the ambient light in a second direction, the first direction has an included angle relative to the second direction, and the included angle is less than 135 degrees and larger than 45 degrees.

2. The display screen component according to claim 1, wherein the ambient-light sensor is arranged adjacent to the periphery of the display screen.

3. The display screen component according to claim 1, wherein the signal emitter and the signal receiver are arranged adjacent to the periphery of the display screen.

4. The display screen component according to claim 1, wherein the ambient-light sensor, the signal emitter and the signal receiver are arranged adjacent to the periphery of the display screen,
   the ambient-light sensor, the signal emitter and the signal receiver are arranged adjacent to one another.

5. The display screen component according to claim 1, wherein the display screen component further comprises a light shield layer, the light shield layer is disposed at a side of the display screen, the signal emitter and the signal receiver are disposed at the side of the display screen, and the light shield layer is arranged between the display screen and the signal emitter as well as the signal receiver.

6. The display screen component according to claim 5, wherein the light shield layer has an opening, the signal emitter and the signal receiver are arranged at the opening.

7. An electronic device, comprising:
   a housing; and
   a display screen component coupled to the housing,
   wherein the display screen component comprises:
   a display screen; and
   an ambient-light sensor arranged at an inner side of the display screen and covered by the display screen, the ambient-light sensor being oriented towards a periphery of the display screen, and configured to sense an intensity of an ambient light, which is incident on the ambient-light sensor through the periphery of the display screen, passing through the housing, and not passing through the display screen, and the housing allowing the ambient light to reach the ambient-light sensor from outside;
   wherein the display screen component further comprises a signal emitter and a signal receiver communicated with the signal emitter, the ambient-light sensor, the signal emitter and the signal receiver are arranged adjacent to one another without a gap therebetween, and packaged into a chip;
   wherein the signal emitter is configured to send out a detecting signal to outside in a first direction, and the signal receiver is configured to receive a reflected signal obtained via reflecting the detecting signal by an external object;
   the ambient-light sensor is configured to sense the intensity of the ambient light in a second direction, the first direction has an included angle relative to the second direction, and the included angle is less than 135 degrees and larger than 45 degrees.

8. The electronic device according to claim 7, wherein the housing is provided with a light-transparent portion, and the light-transparent portion allows the ambient light to pass therethrough from the outside so as to reach the ambient-light sensor.

9. The electronic device according to claim 8, wherein the light-transparent portion defines a light-transparent hole therein.

10. The electronic device according to claim 9, wherein the light-transparent portion comprises a guard plate, the guard plate is light transparent and is arranged at the light-transparent hole.

11. The electronic device according to claim 7, wherein the housing includes four rims connected end to end;
    the electronic device further comprises an earpiece speaker, and the earpiece speaker is arranged adjacent to one of the four rims.

12. The electronic device according to claim 11, wherein the light-transparent portion is arranged in the one of the four rims.

13. The electronic device according to claim 11, wherein the light-transparent portion is arranged in another one of the four rims adjacent to the one of the four rims.

14. The electronic device according to claim 11, wherein the light-transparent portion is arranged in a transition portion from the one of the four rims to another one of the four rims adjacent to the one of the four rims.

* * * * *